US008781720B2

(12) United States Patent
Kindo et al.

(10) Patent No.: US 8,781,720 B2
(45) Date of Patent: Jul. 15, 2014

(54) VEHICLE TRAVEL TRACK ESTIMATOR

(75) Inventors: Toshiki Kindo, Yokohama (JP); Kazuaki Aso, Susono (JP); Masahiro Harada, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 684 days.

(21) Appl. No.: 12/522,797

(22) PCT Filed: Jun. 19, 2008

(86) PCT No.: PCT/JP2008/061587
§ 371 (c)(1),
(2), (4) Date: Jul. 10, 2009

(87) PCT Pub. No.: WO2008/156201
PCT Pub. Date: Dec. 24, 2008

(65) Prior Publication Data
US 2010/0106418 A1 Apr. 29, 2010

(30) Foreign Application Priority Data

Jun. 20, 2007 (JP) ................. 2007-162990

(51) Int. Cl.
*G08G 1/16* (2006.01)
*G05D 1/02* (2006.01)
(52) U.S. Cl.
CPC .................... *G05D 1/027* (2013.01)
USPC ...................................... 701/300
(58) Field of Classification Search
CPC ................................... G05D 1/27

USPC ............... 701/300, 93, 96, 301, 469; 180/271
See application file for complete search history.

(56) References Cited

U.S. PATENT DOCUMENTS

| 2002/0017415 | A1* | 2/2002 | Campbell et al. | 180/271 |
| 2003/0139871 | A1* | 7/2003 | Miller et al. | 701/96 |
| 2005/0251323 | A1* | 11/2005 | Heinrichs-Bartscher | 701/117 |
| 2006/0282218 | A1 | 12/2006 | Urai et al. | |
| 2007/0043502 | A1* | 2/2007 | Mudalige et al. | 701/207 |
| 2008/0065328 | A1 | 3/2008 | Eidehall et al. | |

FOREIGN PATENT DOCUMENTS

| DE | 10 2005 020 731 A1 | 11/2006 |
| JP | A-07-014100 | 1/1995 |
| JP | A-07-104062 | 4/1995 |
| JP | A-08-026053 | 1/1996 |
| JP | A-2004-203384 | 7/2004 |

(Continued)

OTHER PUBLICATIONS

International Preliminary Report on Patentability issued in International Application No. PCT/JP2008/061587; Issued Jan. 12, 2010.

(Continued)

*Primary Examiner* — John Q Nguyen
*Assistant Examiner* — Rodney P King
(74) *Attorney, Agent, or Firm* — Oliff PLC

(57) ABSTRACT

A vehicle risk level acquiring ECU calculates and acquires a plurality of courses of other vehicles around a driver's own vehicle, and acquires the predicted course of the driver's own vehicle. The vehicle risk level acquiring ECU calculates the collision probability of the driver's own vehicle as collision possibility on the basis of the predicted course of the driver's own vehicle and the plurality of courses of other vehicles.

12 Claims, 11 Drawing Sheets

(56) References Cited

FOREIGN PATENT DOCUMENTS

| | | |
|---|---|---|
| JP | A-2004-345401 | 12/2004 |
| JP | A-2006-017473 | 1/2006 |
| JP | A-2006-106955 | 4/2006 |
| JP | A-2006-298294 | 11/2006 |

OTHER PUBLICATIONS

European Search Report issued in Application No. 08 79 0617.8; Dated Apr. 13, 2011.

* cited by examiner

VEHICLE TRAVEL TRACK ESTIMATOR

TECHNICAL FIELD

The present invention relates to a vehicle travel track estimator that estimates the travel track of a target vehicle.

BACKGROUND ART

In recent years, a collision avoidance apparatus has been proposed which detects obstacles around a driver's own vehicle, determines the possibility that the driver's own vehicle will collide with the obstacles, and performs collision avoidance when the collision possibility is high (for example, see JP-A-7-104062). The collision avoidance apparatus predicts the track of the obstacle around the driver's own vehicle, and notifies the driver of a collision risk or automatically decelerates the driver's own vehicle when the driver's own vehicle is likely to collide with the obstacle, thereby avoiding collision.

DISCLOSURE OF THE INVENTION

However, the collision avoidance apparatus disclosed in JP-A-7-104062 uniformly predicts the travel track of an obstacle that is positioned around the driver's own vehicle and is likely to collide with the driver's own vehicle, for example, the travel track of a target vehicle, such as an opposite vehicle, on the basis of, for example, the position, travel direction, and speed of the obstacle. Therefore, for example, even when the state of the obstacle or the surrounding environment of the obstacle varies, the collision avoidance apparatus predicts the same track if the conditions, such as the position, travel direction, and speed of the obstacle, are the same.

However, the surrounding environment of the obstacle or the behavior of the obstacle is actually not uniform. Therefore, the collision avoidance apparatus disclosed in JP-A-7-104062 has a problem in that the accuracy of calculating the travel track of the obstacle (target vehicle) is not high.

Therefore, an object of the invention is to provide a vehicle travel track estimator capable of accurately estimating the travel track of a target vehicle that is likely to collide with a driver's own vehicle.

In order to achieve the above-mentioned object, according to an aspect of the invention, a vehicle travel track estimator includes: a plurality of target vehicle travel track estimating units that estimate a travel track of a target vehicle which is likely to collide with a driver's own vehicle in different ways; and a characteristic detecting unit that detects characteristics of the target vehicle. The target vehicle travel track estimating units are switched on the basis of the characteristics of the target vehicle to estimate the travel track of the target vehicle.

The vehicle travel track estimator according to the invention includes a plurality of target vehicle travel track estimating units that estimate the travel track of the target vehicle which is likely to collide with the driver's own vehicle in different ways, and the target vehicle travel track estimating units are switched on the basis of the characteristics of the target vehicle to estimate the travel track of the target vehicle. As such, it is possible to determine the travel tendency of the target vehicle, for example, the possibility of safe traveling on the basis of the characteristics of the target vehicle. Therefore, it is possible to accurately estimate the travel track of the target vehicle that is likely to collide with the driver's own vehicle.

The characteristic detecting unit may include a driver characteristic acquiring unit that acquires characteristics of a driver of the target vehicle, and the target vehicle travel track estimating units may be switched on the basis of the characteristics of the driver to estimate the travel track of the target vehicle.

As such, the target vehicle travel track estimating units can be switched on the basis of the characteristics of the driver to determine the characteristics of the driver of the target vehicle, for example, whether the driver drives the vehicle recklessly or in a controlled manner. Therefore, it is possible to accurately estimate the travel track of the target vehicle that is likely to collide with the driver's own vehicle.

The driver characteristic detecting unit may include: a vehicle axis direction acquiring unit that acquires the axis direction of the target vehicle; a lane direction acquiring unit that acquires the direction of a lane in which the target vehicle travels; and an axis deviation acquiring unit that acquires the degree of deviation between the axis direction of the target vehicle and the direction of the lane in which the target vehicle travels. The target vehicle travel track estimating units may be switched on the basis of the degree of deviation between the axis direction and the lane direction to estimate the travel track of the target vehicle.

As such, it is possible to determine the travel tendency of the target vehicle, for example, whether the target vehicle travels in its own lane without any change on the basis of the deviation between the axis direction of the target vehicle and the direction of the line in which the target vehicle travels. Therefore, it is possible to accurately estimate the travel track of the target vehicle that is likely to collide with the driver's own vehicle.

The driver characteristic detecting unit may include a parameter acquiring unit that acquires a reaction parameter related to the reaction of the driver of the target vehicle to other vehicles, and the target vehicle travel track estimating units may be switched on the basis of the reaction parameter related to the reaction of the target vehicle to other vehicles to estimate the travel track of the target vehicle.

As such, since the target vehicle travel track estimating units are switched on the basis of the reaction parameter related to the reaction of the target vehicle to other vehicles, it is possible to reflect the reaction of the target vehicle to the surrounding traffic environment to the estimation of the travel track of the target vehicle. Therefore, it is possible to accurately estimate the travel track of the target vehicle that is likely to collide with the driver's own vehicle.

The reaction parameter may indicate the tolerable risk level of the target vehicle for collision.

As such, the reaction parameter indicates the tolerable risk level of the target vehicle for collision. Therefore, for example, it is possible to estimate that a vehicle having low risk sensitivity to another vehicle on the rear left side of the vehicle can easily change its lane, even when there is another vehicle on the left rear side of the vehicle. As a result, it is possible to more accurately estimate the travel track of the target vehicle that is likely to collide with the driver's own vehicle.

The reaction parameter may indicate the sensitivity of the target vehicle to a risk.

As such, the reaction parameter indicates the sensitivity of the target vehicle to a risk. Therefore, for example, when the driver's ability to concentrate is lowered, it is possible to estimate that the reaction of the driver to a risk is lowered. As a result, it is possible to more accurately estimate the travel track of the target vehicle that is likely to collide with the driver's own vehicle.

The parameter indicating the sensitivity of the target vehicle to the risk may be the degree of alertness of the driver of the target vehicle.

As such, since the parameter indicating the sensitivity of the target vehicle to the risk is the degree of alertness of the driver of the target vehicle, it is possible to reflect the drowsiness of the driver to the estimation of the travel track. Therefore, it is possible to more accurately estimate the travel track of the target vehicle that is likely to collide with the driver's own vehicle.

The characteristic detecting unit may include a vehicle characteristic acquiring unit that acquires vehicle characteristics of the target vehicle, and the target vehicle travel track estimating units may be switched on the basis of the vehicle characteristics of the target vehicle to estimate the travel track of the target vehicle.

As such, since the travel track is estimated on the basis of the vehicle characteristic of the target vehicle, it is possible to estimate a travel track corresponding to the type of target vehicle. Therefore, it is possible to estimate the travel track of the target vehicle that is likely to collide with the driver's own vehicle more accurately. In addition, in the invention, the vehicle characteristics include, for example, the specifications of a vehicle (for example, an outer size and a minimum turning radius) and the driving performance thereof (for example, a maximum speed, a maximum acceleration, a maximum deceleration, and a steering following performance).

A new application range of the invention will be apparent from the following detailed description of the invention. However, the detailed description and specific examples are for showing the exemplary embodiments of the invention, and are just illustrative. It will be understood by those skilled in the art that various modifications and changes of the invention can be made without departing from the scope and spirit of the invention.

BEST MODE FOR CARRYING OUT THE INVENTION

Figure 1:
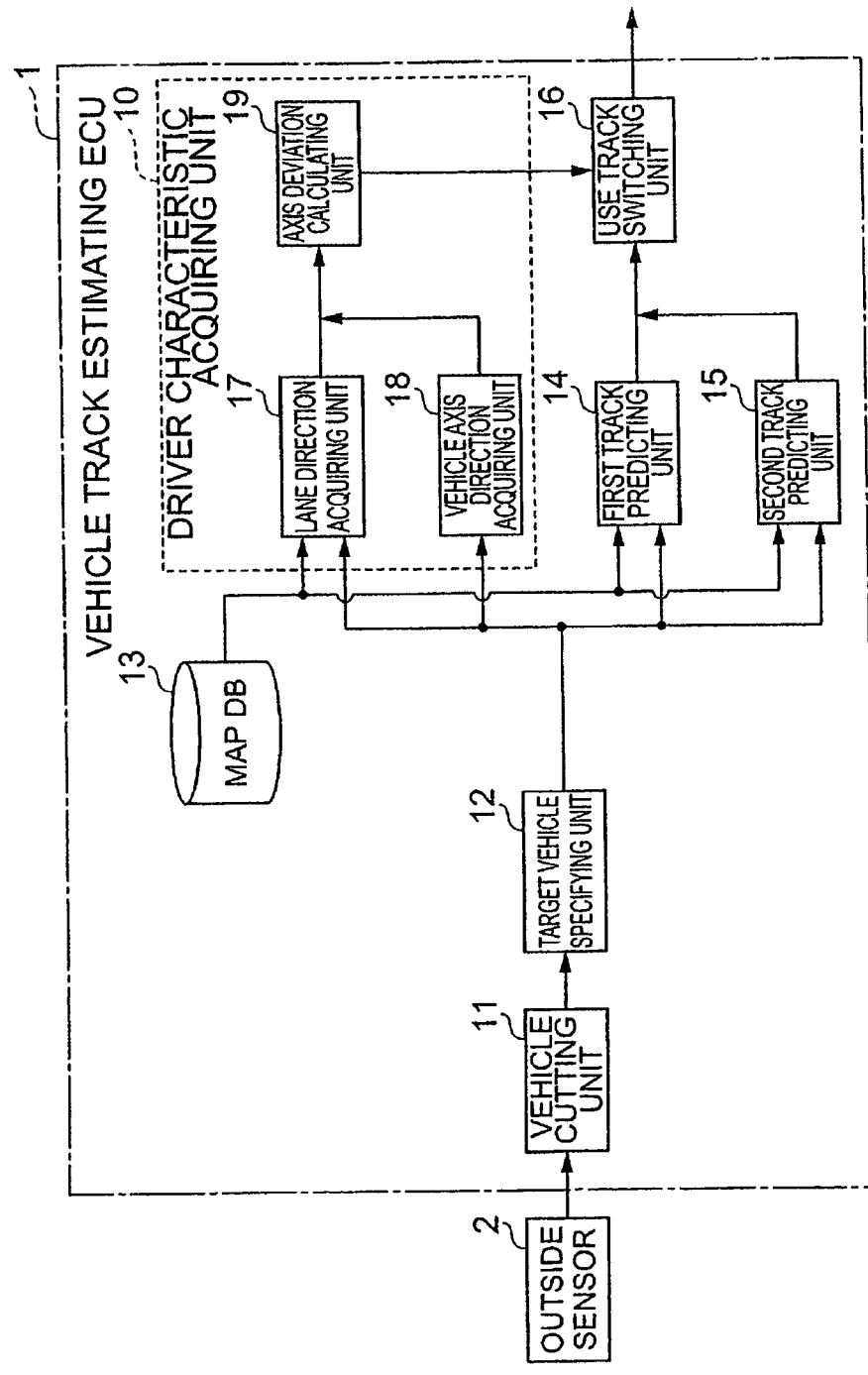
FIG. 1 is a block diagram illustrating the structure of a vehicle travel track estimator according to a first embodiment.

Hereinafter, exemplary embodiments of the invention will be described with reference to the accompanying drawings. In the description of the drawings, the same components are denoted by the same reference numerals and a repeated description thereof will be omitted. In addition, for convenience of illustration, the dimensions and scale of each component are not necessarily identical to the actual dimensions and scale in the drawings.

FIG. 1 is a block diagram illustrating the structure of a vehicle travel track estimator according to a first embodiment of the invention. As shown in FIG. 1, the vehicle travel track estimator includes a vehicle track estimating ECU 1 and an outside sensor 2. The vehicle track estimating ECU 1 is a vehicle device computer for electronic control, and includes, for example, a CPU (central processing unit), a ROM (read only memory), a RAM (random access memory), and an input/output interface. In addition, the vehicle track estimating ECU 1 includes a driver characteristic acquiring unit 10, a vehicle cutting unit 11, a target vehicle specifying unit 12, a map database 13, a first track predicting unit 14, a second track predicting unit 15, and a use track switching unit 16. The driver characteristic acquiring unit 10 includes a lane direction acquiring unit 17, a vehicle axis direction acquiring unit 18, and an axis deviation calculating unit 19.

The outside sensor 2 includes, for example, a millimeter wave radar sensor, a laser radar sensor, or an image sensor, and detects, for example, pedestrians or other vehicles around the driver's own vehicle. The outside sensor 2 transmits surrounding information related to the detected vehicles other than the driver's own vehicle to the vehicle track estimating ECU 1.

The vehicle cutting unit 11 of the vehicle track estimating ECU 1 cuts out other vehicles around the driver's own vehicle from the surrounding information transmitted from the outside sensor 2. For example, when the outside sensor 2 is a millimeter wave radar sensor or a laser radar sensor, the vehicle cutting unit 11 cuts out other vehicles on the basis of, for example, the wavelengths of waves reflected from other vehicles, In addition, when the outside sensor 2 is an image sensor, the vehicle cutting unit 11 cuts out other vehicles as obstacles from a captured image using, for example, a pattern matching method.

Further, the vehicle cutting unit 11 calculates the speeds and positions of the cut vehicles. The vehicle cutting unit 11 outputs the cut vehicles and vehicle information related to the speeds and positions of the cut vehicles to the target vehicle specifying unit 12. In addition, when cutting out a plurality of other vehicles, the vehicle cutting unit 11 outputs other vehicle information related to all of the plurality of other vehicles to the target vehicle specifying unit 12.

The target vehicle specifying unit 12 specifies a target vehicle which is a movement prediction target and is likely to collide with the driver's own vehicle from other vehicles on the basis of target vehicle information output from the vehicle cutting unit 11. The target vehicle specifying unit 12 outputs the specified target vehicle and target vehicle information related to the speed and position of the target vehicle to the lane direction acquiring unit 17, the vehicle axis direction acquiring unit 18, the first track predicting unit 14, and the second track predicting unit 15.

The map database 13 stores map information of the road on which the driver's own vehicle travels. In addition, the map information of the map database 13 includes traffic regulation information corresponding to a position on the map. The map database 13 outputs the map information including the traffic regulation information to the first track predicting unit 14, the second track predicting unit 15, and the lane direction acquiring unit 17 in response to requests from the first track predicting unit 14, and the second track predicting unit 15, and the lane direction acquiring unit 17, respectively.

The first track predicting unit 14 stores a first prediction model that predicts the track of the target vehicle under restricted conditions that the driver observes the traffic regulations. The first track predicting unit 14 applies the speed and position of the target vehicle based on the target vehicle information output from the target vehicle specifying unit 12 and the map information read from the map database 13 to the first prediction model, thereby calculating a first target vehicle travel track of the target vehicle. The first track predicting unit 14 outputs first predicted track information related to the calculated first target vehicle travel track to the use track switching unit 16.

The second track predicting unit 15 stores a second prediction model that predicts the track of the target vehicle under the conditions that the driver does not observe the traffic regulations. The second track predicting unit 15 applies the speed and position of the target vehicle based on the target vehicle information output from the target vehicle specifying unit 12 and the map information read from the map database 13 to the second prediction model, thereby calculating a second target vehicle travel track as the predicted track of the target vehicle. The second track predicting unit 15 outputs second target vehicle travel track information related to the calculated second target vehicle travel track to the use track switching unit 16.

When the target vehicle information is output from the target vehicle specifying unit 12, the lane direction acquiring unit 17 of the driver characteristic acquiring unit 10 reads the map information from the map database. The lane direction acquiring unit 17 acquires a lane direction, which is the lane direction of the road on which the target vehicle is positioned, with reference to the position of the target vehicle included in the target vehicle information in the map information. The lane direction acquiring unit 17 outputs lane direction information related to the acquired lane direction to the axis deviation calculating unit 19.

The axis direction acquiring unit 18 acquires the axis direction of the target vehicle from a variation in the speed and position of the target vehicle based on the target vehicle information output from the target vehicle specifying unit 12 over time. The lane direction acquiring unit 17 outputs vehicle axis direction information related to the acquired axis direction of the target vehicle to the axis deviation calculating unit 19.

The axis deviation calculating unit 19 compares the lane direction of the road on which the target vehicle is positioned, which is based on the lane direction information output from the lane direction acquiring unit 17, with the axis direction of the target vehicle, which is based on the vehicle axis direction information output from the vehicle axis direction acquiring unit 18, and calculates an axis deviation amount, which is the amount of deviation between the lane direction of the road and the axis direction of the target vehicle (hereinafter, referred to as 'axis deviation').

In addition, the axis deviation calculating unit 19 stores the threshold value of an axis deviation corresponding to the possibility that the target vehicle will observe the traffic regulations. If the calculated axis deviation amount is more than the threshold value of the axis deviation, the axis deviation calculating unit 19 outputs a second prediction switching signal for switching to the first target vehicle travel track to the use track switching unit 16. On the other hand, if the calculated axis deviation amount is equal to or less than the threshold value of the axis deviation, the axis deviation calculating unit 19 does not output the switching signal.

The use track switching unit 16 performs switching between a first target vehicle travel track prediction operation based on the first target vehicle travel track information output from the first track predicting unit 14 and a second target vehicle travel track prediction operation based on the second target vehicle travel track information output from the second track predicting unit 15, on the basis of the switching signal output from the axis deviation calculating unit 19. When the axis deviation calculating unit 19 does not output the switching signal, the first target vehicle travel track is used as the estimated track of the target vehicle. On the other hand, when the axis deviation calculating unit 19 outputs the switching signal, the second target vehicle travel track is used as the estimated track of the target vehicle.

Figure 2:
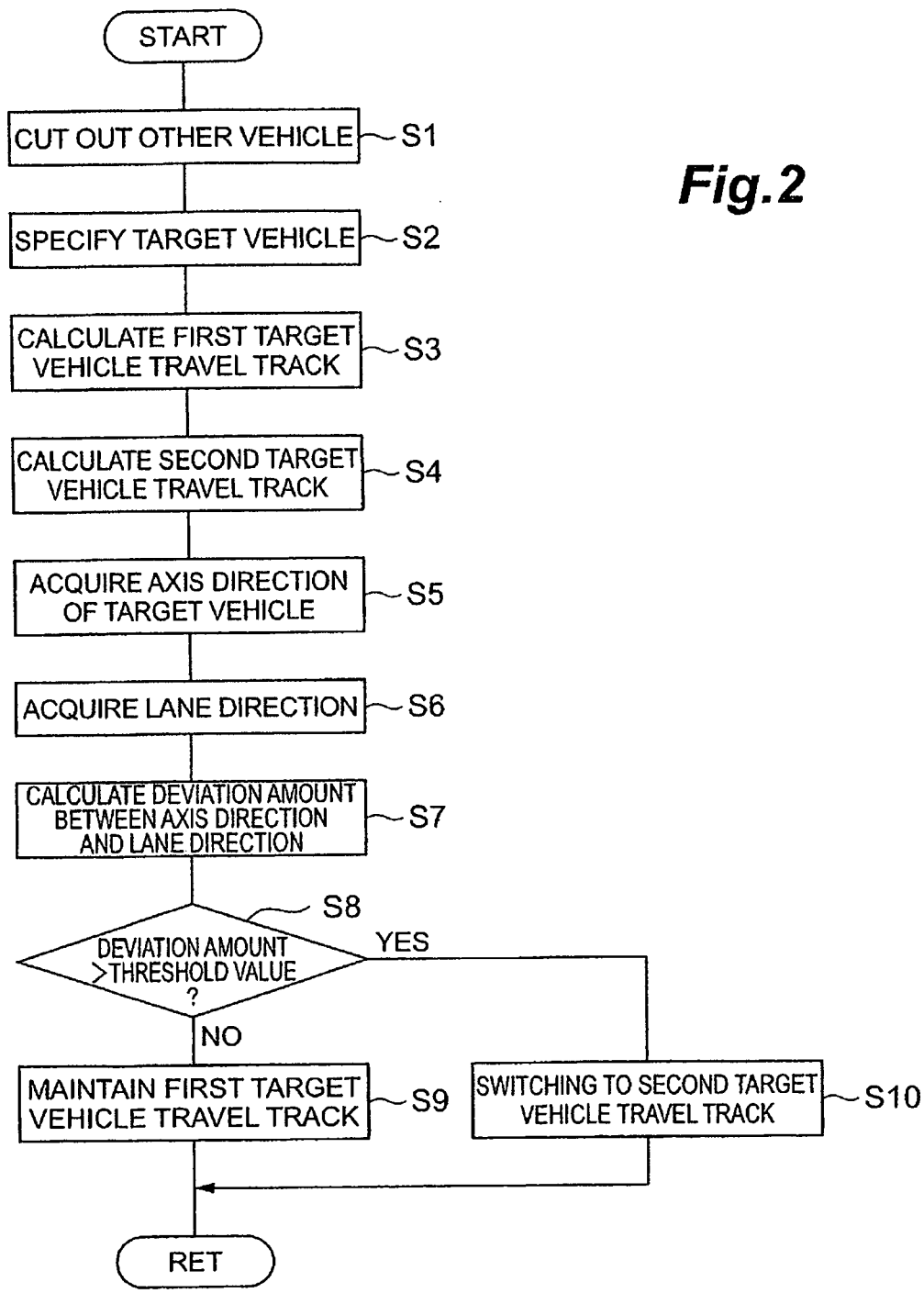
FIG. 2 is a flowchart illustrating a process of a vehicle track estimating ECU according to the first embodiment.

Next, a process of the vehicle track estimating ECU according to this embodiment will be described. FIG. 2 is a flowchart illustrating the process of the vehicle track estimating ECU according to this embodiment.

As shown in FIG. 2, in the vehicle track estimating ECU 1, first, the vehicle cutting unit 11 cuts out other vehicles from the surrounding information transmitted from the outside sensor 2 (S1). Then, the target vehicle specifying unit 12 specifies a target vehicle which is a movement prediction target and is likely to collide with the driver's own vehicle from other vehicles (S2). For example, when only one vehicle is cut out from the surrounding information, it is possible to use the vehicle as the target vehicle. In addition, for example, it is possible to use, as the target vehicle, one vehicle closest to the driver's own vehicle or one vehicle having the highest speed among other vehicles cut out from the surrounding information. In addition, it is possible to specify the target vehicle considering both the positions and the speeds of other vehicles.

After the target vehicle is specified, the first track predicting unit 14 uses the first prediction model to calculate the first target vehicle travel track (S3). The first prediction model is used to calculate a first available course through which the target vehicle can be moved as the first target vehicle travel track. The first available course is calculated as follows. As the first available course through which the target vehicle can be moved, a course until a predetermined time for which the target vehicle is moving has elapsed, not a first available course to a certain destination, is calculated. In general, there is no safe place on the road on which the driver's own vehicle travels. Even when the destinations of the driver's own vehicle and the target vehicle are calculated in order to determine collision possibility therebetween, it is difficult to reliably avoid the collision therebetween.

Figure 3:
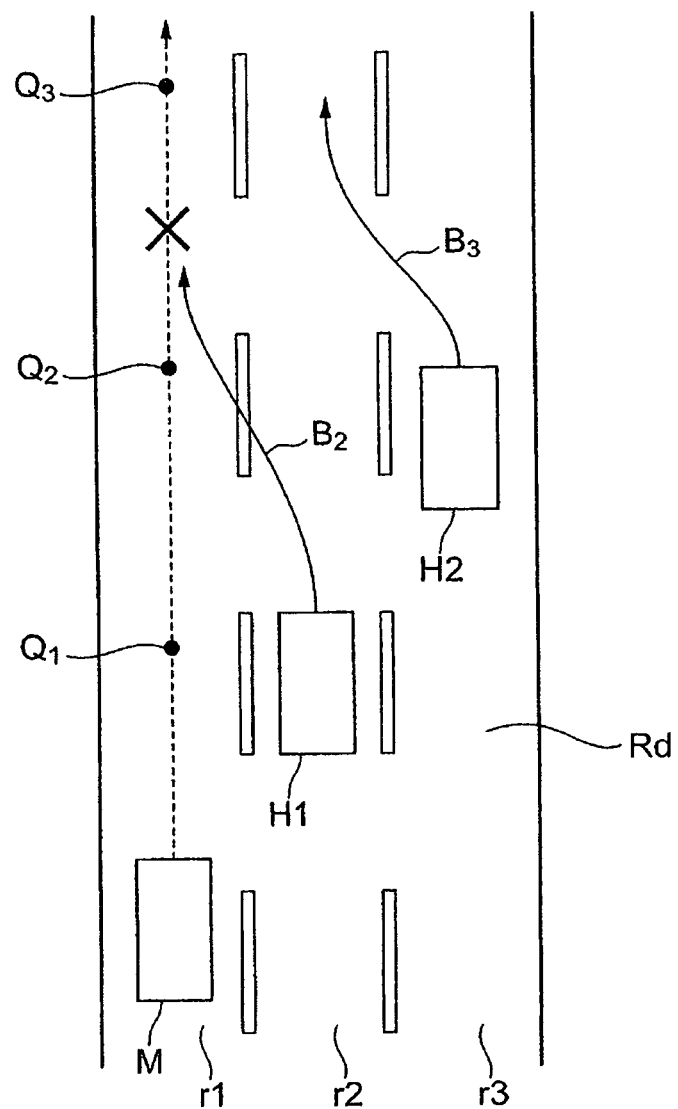
FIG. 3 is a diagram schematically illustrating the traveling state of a driver's own vehicle and other vehicles.

For example, as shown in FIG. 3, it is assumed that a vehicle M travels in a first lane r1, a first target vehicle H1 travels in a second lane r2, and a second target vehicle H2 travels in a third lane on a three-lane road R. In this case, in order to avoid the collision between the vehicle M and the target vehicles H1 and H2 respectively traveling in the second and third lanes r2 and r3, it is considered that the vehicle M preferably travels to positions Q1, Q2, and Q3. However, when the second target vehicle H2 takes a course B3 to change its course to the second lane r2, it is considered that the first target vehicle H1 takes a course 82 in order to avoid collision with the second target vehicle H2, and enters the first lane r1. In this case, when the vehicle M travels so as to reach the positions Q1, Q2, and Q3, the vehicle M is likely to collide with the first target vehicle H1.

Figure 4:
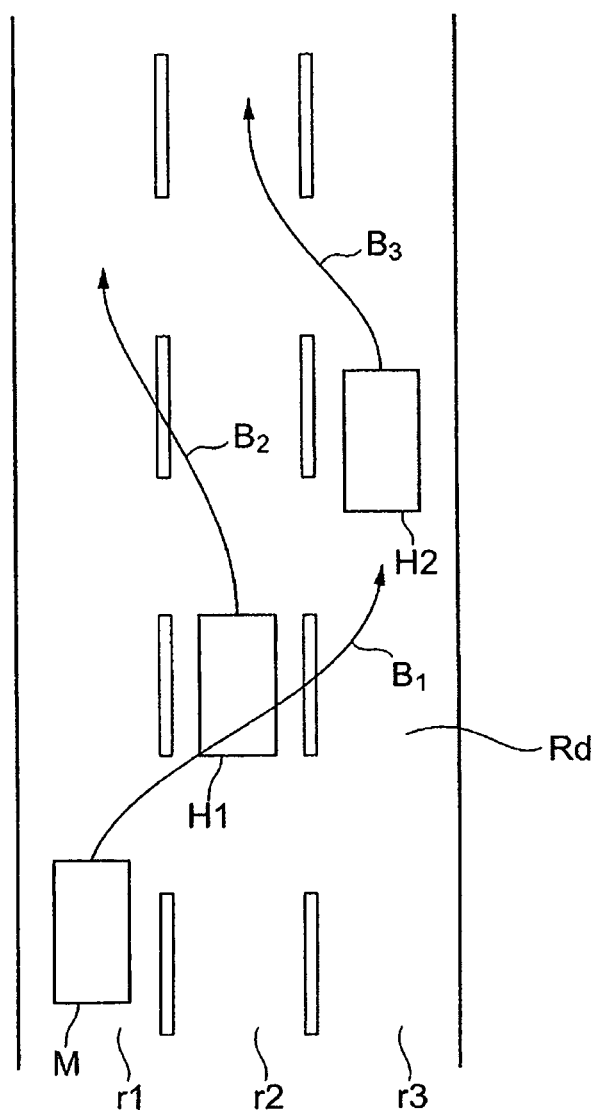
FIG. 4 is a diagram schematically illustrating the travel course of the driver's own vehicle.

Therefore, the destinations of the driver's own vehicle and the target vehicle are not predetermined, but the courses of the driver's own vehicle and the target vehicle are predicted whenever the courses are changed. When the courses of the driver's own vehicle and the target vehicle are predicted whenever the courses are changed, for example, it is possible to use the course B1 shown in FIG. 4 as the course of the driver's own vehicle. Therefore, it is possible to reliably avoid the risk when the vehicle M travels. As a result, it is possible to ensure safety.

The first available course of the target vehicle until the travel distance of the target vehicle reaches a predetermined distance may be calculated, instead of defining a predetermined movement time for which the target vehicle is moved. In this case, it is possible to appropriately change a predetermined distance according to the speed of the target vehicle (or the speed of the driver's own vehicle).

The first available course of each target vehicle is calculated as follows. An initializing process of setting the value of a counter k for identifying a target vehicle to 1 and setting the value of a counter n indicating the number of times the first available course of the same target vehicle is generated to 1. Then, the position and movement distance (speed and movement direction) of the target vehicle is initialized on the basis of the target vehicle information extracted from information related to the target vehicle transmitted from the outside sensor 2.

Then, among a plurality of behaviors of the target vehicle that can be selected as the behaviors of the target vehicle considered during a predetermined time Δt, one behavior is selected according to a first behavior selection probability given to each behavior. A behavior selection probability when the target vehicle is operated under the conditions that the driver of the target vehicle observes the traffic regulations is set as the first behavior selection probability.

The selection of the behavior of the target vehicle considered during the predetermined time Δt is repeatedly performed on the basis of the behavior selection probability to select the behavior of the target vehicle until a predetermined movement time for which the target vehicle is moving has elapsed. The first available course of the target vehicle is calculated as the first target vehicle travel track by the selected behavior of the target vehicle.

After the first target vehicle travel track is calculated, the second target vehicle travel track is calculated (S4). The second target vehicle travel track is calculated by the same method as that calculating the first target vehicle travel track, but is different therefrom in that the second prediction model is used. The second prediction model is different from the first prediction model in the behavior selection probability. The first prediction model uses the first behavior selection probability assuming that the driver of the target vehicle observes the traffic regulations. However, the second prediction model uses the second behavior selection probability assuming that the driver of the target vehicle is not likely to observe the traffic regulations. In this way, the second target vehicle travel track is calculated.

For example, the behavior selection probability when one behavior is selected is defined by associating a component of a set of selectable behaviors with a predetermined random number. Therefore, different behavior selection probabilities are given to the behaviors, or the same probability is given to all components of a set of behaviors. In addition, the behavior selection probability may depend on the position or the traveling state of the target vehicle and the surrounding road environment.

After the second target vehicle travel track is calculated, the vehicle axis direction acquiring unit 18 acquires the axis direction of the target vehicle (S5). The axis direction of the target vehicle is acquired on the basis of a variation in the speed and position of the target vehicle output from the target vehicle specifying unit 12 over time. Then, the lane direction acquiring unit 17 acquires the lane direction of the road on which the target vehicle travels (S6). The lane direction acquiring unit 17 acquires the lane direction of the road on which the target vehicle travels with reference to the travel position of the target vehicle on the map read from the map database 13.

Then, the axis deviation calculating unit 19 calculates the deviation between the vehicle axis direction and the lane direction (S7). In general, the driver who tends to observe the traffic regulations is more likely to align the vehicle axis direction with the lane direction. Therefore, when the deviation between the vehicle axis direction and the lane direction is small, the driver of the target vehicle is more likely to observe the traffic regulations. On the other hand, when the deviation between the vehicle axis direction and the lane direction is large, there is a high possibility that the driver of the target vehicle will not observe the traffic regulations.

Therefore, it is determined whether the calculated deviation between the vehicle axis direction and the lane direction is more than an axis deviation threshold value (S8). As a result, if it is determined that the calculated deviation between the vehicle axis direction and the lane direction is equal to or less than a predetermined threshold value, no switching signal is output to the use track switching unit 16. Therefore, the use track switching unit 16 maintains the first target vehicle travel track as the estimated target vehicle travel track (S9). On the other hand, if it is determined that the calculated deviation between the vehicle axis direction and the lane direction is more than the predetermined threshold value, a switching signal is output to the use track switching unit 16. Therefore, the use track switching unit 16 switches the estimated target vehicle travel track to the second target vehicle travel track (S10). In this way, the travel track of the target vehicle is predicted.

Figure 5:
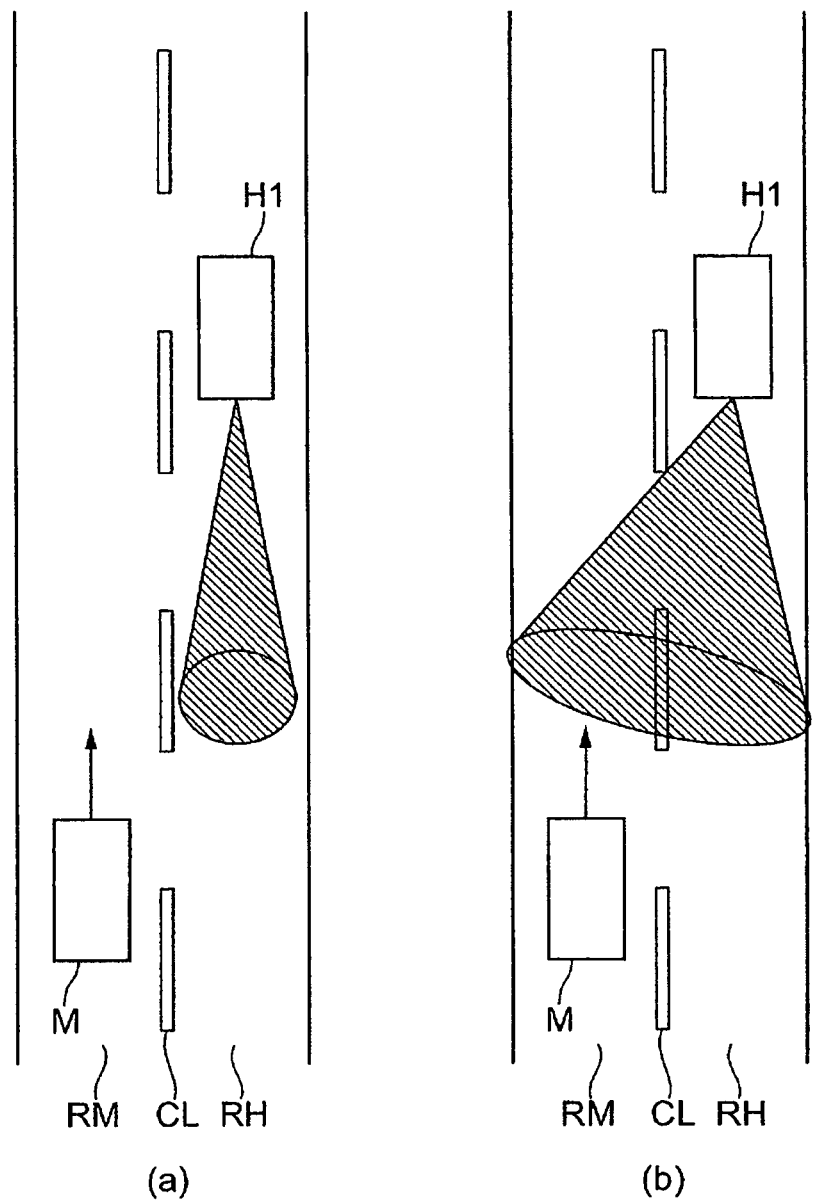
FIG. 5(a) is a diagram schematically illustrating a range that is estimated as the travel track of a target vehicle that is more likely to observe traffic regulations.
FIG. 5(b) is a diagram schematically illustrating a range that is estimated as the travel track of a target vehicle that is less likely to observe the traffic regulations.

For example, as shown in FIG. 5(a), when a vehicle M in a lane RM and a target vehicle H1 in an opposite lane RH travel substantially in parallel to a lane CL, the first target vehicle travel track in which the driver of the target vehicle H is more likely to observe the traffic regulations is estimated as the target vehicle travel track. The first target vehicle travel track is estimated within a relatively narrow range. In addition, as shown in FIG. 5(b), when the travel direction of the target vehicle H1 in the opposite lane RH, which is opposite to the vehicle M traveling in the lane RM, is inclined at a predetermined angle with respect to the lane CL, the second target vehicle travel track in which the driver of the target vehicle H1 is less likely to observe the traffic regulations is estimated as the target vehicle travel track. The second target vehicle travel track is estimated within a relatively wide range.

In the case in which the travel track of the target vehicle is uniformly determined, when collision determination is performed such that collision possibility with the target vehicle increases, there is a high possibility that a collision will be determined. As a result, an unnecessary collision warning is frequently issued. On the other hand, when collision determination is performed such that collision possibility with the target vehicle decreases, it is difficult to perform effective collision determination.

Therefore, the vehicle travel track estimator according to this embodiment determines the characteristics of the driver of the target vehicle and refers to whether the possibility of the driver observing the traffic regulations is high. Therefore, it is possible to accurately estimate the travel track of the target vehicle that is likely to collide with the driver's own vehicle. In addition, since the travel track of the target vehicle can be accurately estimated, it is possible to reliably perform collision determination. As a result, it is possible to perform effective collision determination while reducing, for example, an unnecessary warning.

Figure 6:
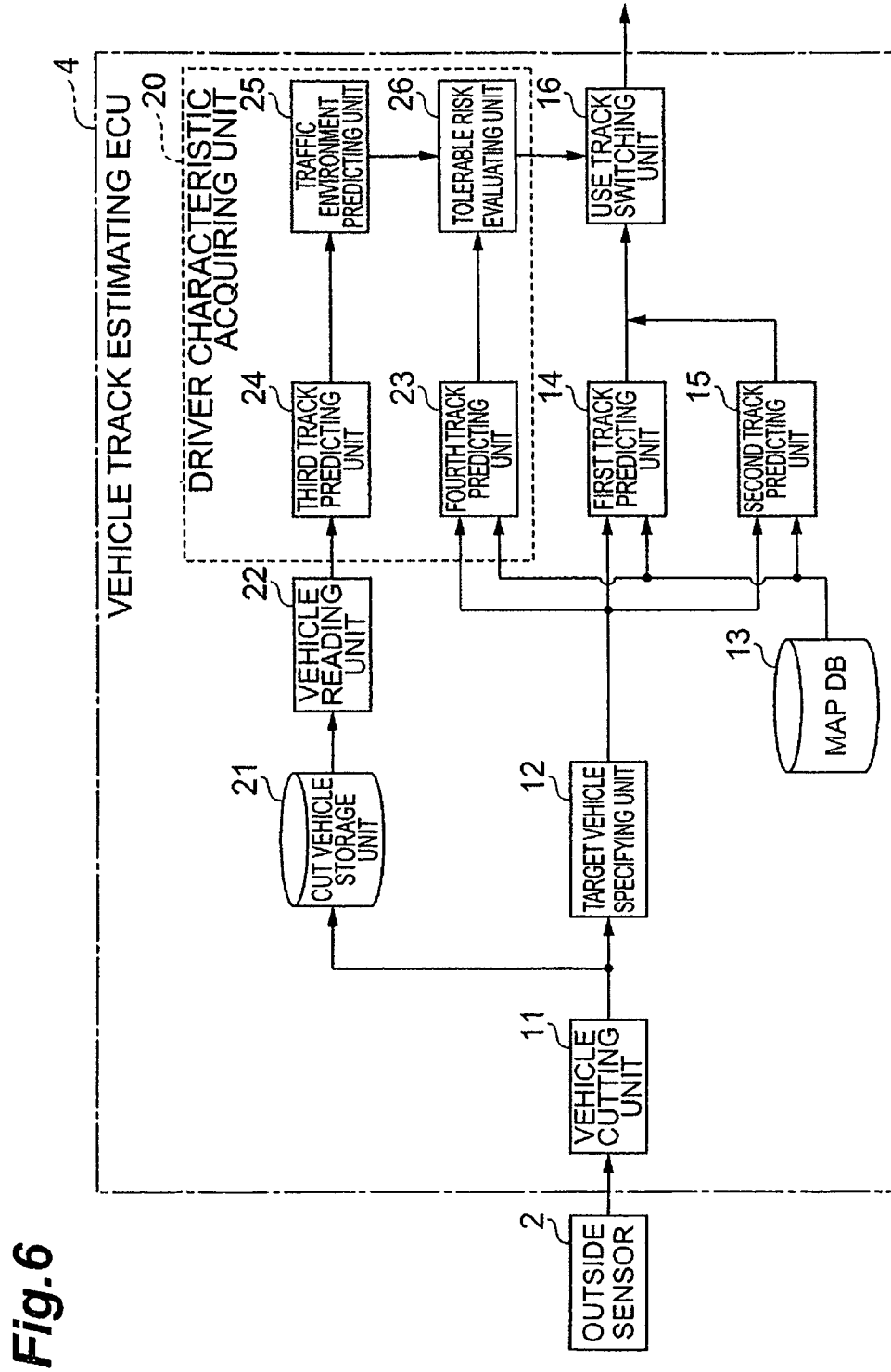
FIG. 6 is a block diagram illustrating the structure of a vehicle travel track estimator according to a second embodiment.

Next, a second embodiment of the invention will be described. This embodiment mainly differs from the first embodiment in the structure of a driver characteristic acquiring unit. FIG. 6 is a block diagram illustrating the structure of a vehicle travel track estimator according to this embodiment.

As shown in FIG. 6, a vehicle track estimating ECU 4 of the vehicle track estimator according to this embodiment includes a driver characteristic acquiring unit 20, a vehicle cutting unit 11, a target vehicle specifying unit 12, a map database 13, a first track predicting unit 14, a second track predicting unit 15, and a use track switching unit 16. In addition, the vehicle track estimating ECU 4 includes a cut vehicle storage unit 21 and a vehicle reading unit 22. The driver characteristic acquiring unit 20 includes a third track predicting unit 23, a fourth track predicting unit 24, a traffic environment predicting unit 25, and a tolerable risk evaluating unit 26.

The vehicle cutting unit 11 outputs the cut vehicles and other vehicle information related to the speeds and positions of other vehicles to the target vehicle specifying unit 12 and the cut vehicle storage unit 21. The cut vehicle storage unit 21 stores other vehicle information related to the speeds and positions of the vehicles cut by the vehicle cutting unit 11 so as to be associated with other vehicles. The term 'other vehicles' means vehicles other than a target vehicle, and also includes the driver's own vehicle. In this case, a driver's own vehicle sensor that detects the speed or position of the driver's own vehicle is separately provided; and outputs the acquired driver's own vehicle information to the cut vehicle storage unit 21.

The vehicle reading unit 22 reads other vehicle information stored in the cut vehicle storage unit 21, and recognizes the speeds and positions of other vehicles. In this case, the vehicle reading unit recognizes the speeds and positions of a plurality of other vehicles including a specific vehicle and all the vehicles other than the target vehicle. The vehicle reading unit 22 outputs other vehicle information related to the recognized speeds and positions of other vehicles to the third track predicting unit 23 of the driver characteristic acquiring unit 20.

The third track predicting unit 23 of the driver characteristic acquiring unit 20 stores the first prediction model, and predicts the travel track of each vehicle as a third track on the basis of the speeds and positions of other vehicles based on other vehicle information read from the vehicle reading unit 22. The first prediction model used by the first track predicting unit 14 is used to predict the third track (the travel tracks of other vehicles). The third track predicting unit 23 outputs other vehicle track information based on the predicted travel tracks of other vehicles to the traffic environment predicting unit 25.

The fourth track predicting unit 24 stores the first prediction model, and applies the speed and position of the target vehicle based on the target vehicle information output from the target vehicle specifying unit 12 and the map information read from the map database 13 to the first prediction model to predict the fourth travel track of the target vehicle. The fourth track predicting unit 24 outputs fourth track information based on the predicted fourth track to the tolerable risk evaluating unit 26.

The traffic environment predicting unit 25 predicts a traffic environment formed by a plurality of other vehicles including the target vehicle on the basis of the other vehicle track information output from the third track predicting unit 23. The traffic environment is formed by the number of other vehicles, the speeds of other vehicles, and the relative positional relationship between the vehicles. For example, when there is a plurality of other vehicles, the speeds of other vehicles are high, and other vehicles are close to each other, the tolerable risk evaluating unit 25, which will be described below, calculates that all the fourth tracks output from the fourth track predicting unit 24 are at high risk levels using a predetermined method. The traffic environment predicting unit 25 outputs traffic environment information based on the predicted traffic environment to the tolerable risk evaluating unit 26.

The tolerable risk evaluating unit 26 calculates the risk level of the fourth track, on the basis of the fourth track of the target vehicle based on the fourth track information output from the fourth track predicting unit 24 and the traffic environment based on the traffic environment information output from the traffic environment predicting unit 25, using a predetermined method. Any risk calculating method may be used. Preferably, a method of quantifying accident probability, such as collision probability with the target vehicle and time to collision, from the third and fourth tracks is used. The risk is permitted to the target vehicle at each calculation time (tolerable risk). The tolerable risk is evaluated as follows, For example, when the speed of a vehicle is high in a bad traffic environment or when a vehicle is close to other vehicles, it is determined that the tolerable risk level is high. The tolerable risk means the reaction of the driver of the target vehicle to other vehicles. It is preferable that the tolerable risk be subjected to a statistical process. For example, the tolerable risk is preferably an average value during a predetermined time.

The tolerable risk evaluating unit 26 determines whether the evaluated tolerable risk is more than a predetermined tolerable risk threshold value. If the tolerable risk is more than the predetermined tolerable risk threshold value, a second prediction switching signal for switching to the first target vehicle travel track is output to the use track switching unit 16. On the other hand, if the tolerable risk is equal to or less than the tolerable risk threshold value, the switching signal is not output.

Figure 7:
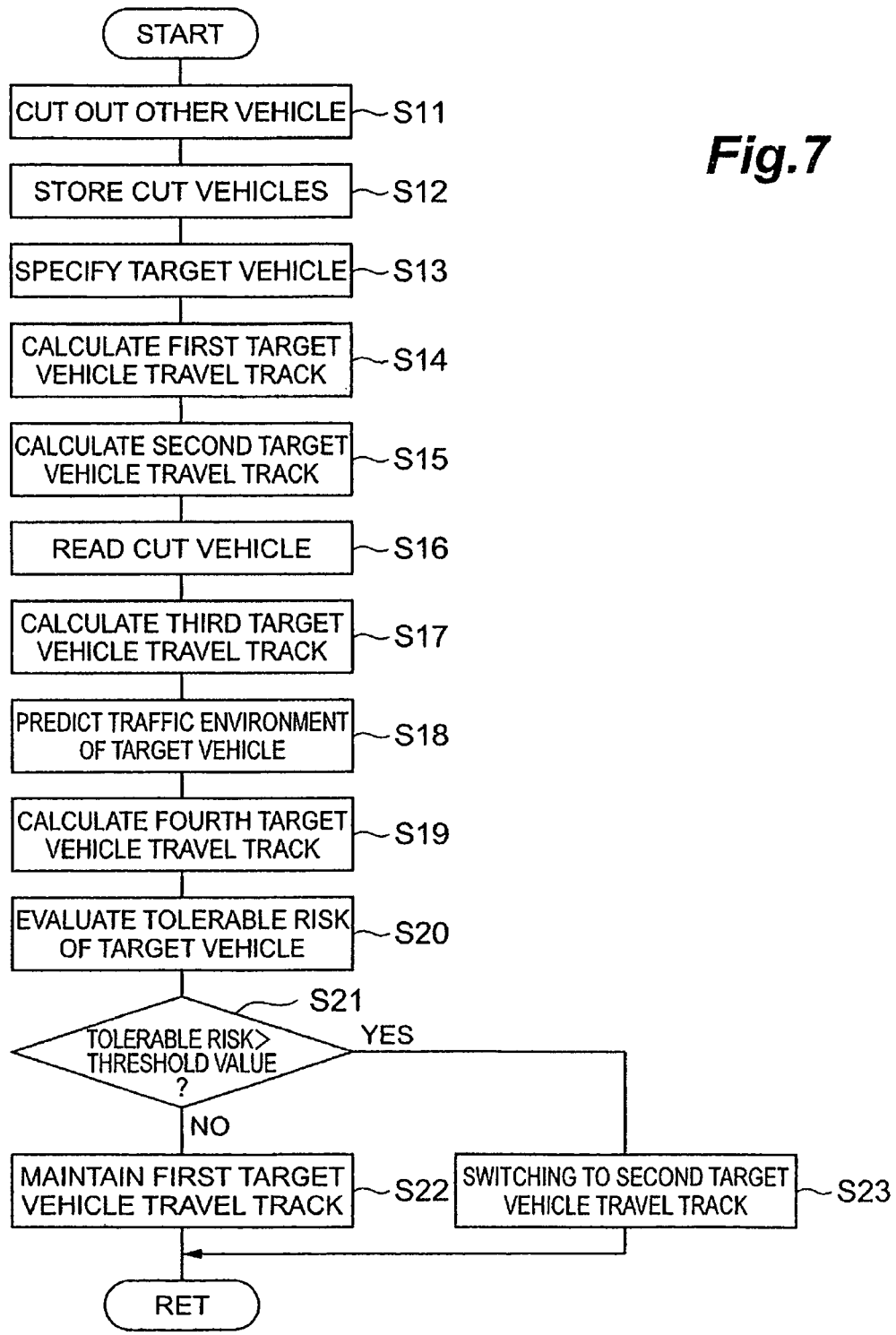
FIG. 7 is a flowchart illustrating a process of a vehicle track estimating ECU according to the second embodiment.

Next, a process of the vehicle track estimating ECU according to this embodiment will be described. FIG. 7 is a flowchart illustrating the process of the vehicle track estimating ECU according to this embodiment.

As shown in FIG. 7, similar to the first embodiment, in the vehicle track estimating ECU 4 according to this embodiment, first, the vehicle cutting unit 11 cuts out other vehicles from the surrounding information transmitted from the outside sensor 2 (S11). Then, other vehicle information related to the speeds and positions of other vehicles, which are the cut vehicles, is stored in the cut vehicle storage unit 21 (S12). The target vehicle specifying unit 12 then specifies a target vehicle which is a movement prediction target and is likely to collide with the driver's own vehicle among other vehicles (S13). The process of specifying the target vehicle is the same as that in the first embodiment.

Then, the first track predicting unit 14 calculates the first target vehicle travel track (S14), and then the second track predicting unit 15 calculates the second target vehicle travel track (S15). The method of calculating the first target vehicle travel track and the second target vehicle travel track is the same as that in the first embodiment.

Then, the vehicle reading unit 22 reads the cut vehicle stored in the cut vehicle storage unit 21 (S16). Then, the third track predicting unit 23 calculates the travel tracks of other vehicles as the third track and predicts the travel tracks (S17). A process of calculating the third track is the same as the process of calculating the first target vehicle travel track. Then, the traffic environment predicting unit 25 predicts a traffic environment (S18). The traffic environment is predicted on the basis of the speeds of a plurality of other vehicles calculated as the third track or the relative positional relationship therebetween.

The fourth track predicting unit 24 predicts the fourth target vehicle travel track as the fourth track (S19). The fourth target vehicle travel track is calculated by the same process as that used to calculate the first target vehicle travel track. Then, the tolerable risk evaluating unit 26 evaluates a target vehicle tolerable risk, which is the tolerable risk of the target vehicle (S20). The reaction of the driver of the target vehicle to other vehicles is represented by the evaluation of the tolerable risk.

Then, the tolerable risk evaluating unit 26 determines whether the calculated tolerable risk level is more than a tolerable risk threshold value using the calculated tolerable risk level as a reaction parameter of the driver of a specific vehicle to other vehicles (S21). As a result, when it is determined that the calculated tolerable risk level is equal to or less than the tolerable risk, no switching signal is output to the use track switching unit 16. Therefore, the use track switching unit 16 maintains the first target vehicle travel track as an estimated target vehicle travel track (S22). On the other hand, when it is determined that the calculated tolerable risk level is more than the tolerable risk threshold value, a switching signal is output to the use track switching unit 16. Therefore, the use track switching unit 16 switches the estimated target vehicle travel track to the second target vehicle travel track (S23). In this way, the travel track of the target vehicle is predicted.

As such, the vehicle travel track estimator according to this embodiment performs switching between the first target vehicle travel track and the second target vehicle travel track on the basis of the tolerable risk level, which is a reaction parameter of the target vehicle to other vehicles. Therefore, it is possible to reflect the reaction of the target vehicle to the surrounding traffic environment to the estimation of the travel track of the target vehicle. As a result, it is possible to accurately estimate the travel track of the target vehicle that is likely to collide with the driver's own vehicle. In addition, a parameter indicating the tolerable risk of the target vehicle with respect to collision is used as a reaction parameter. Therefore, for example, it is possible to estimate that a vehicle having low risk sensitivity to another vehicle on the rear left side can easily change its lane, even when there is another vehicle on the left rear side of the vehicle. As a result, it is possible to accurately estimate the travel track of the target vehicle that is likely to collide with the driver's own vehicle.

Figure 8:
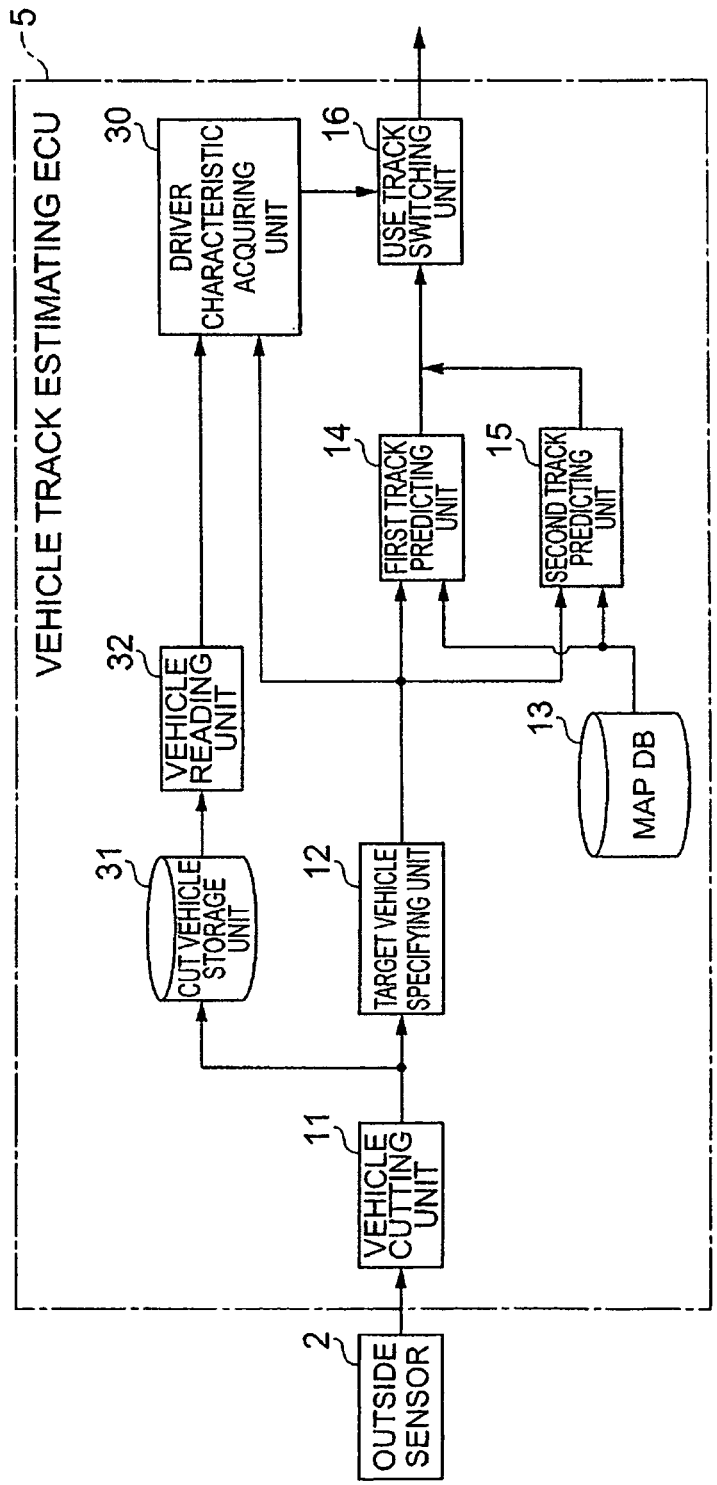
FIG. 8 is a block diagram illustrating the structure of a vehicle travel track estimator according to a third embodiment.
Figure 9:
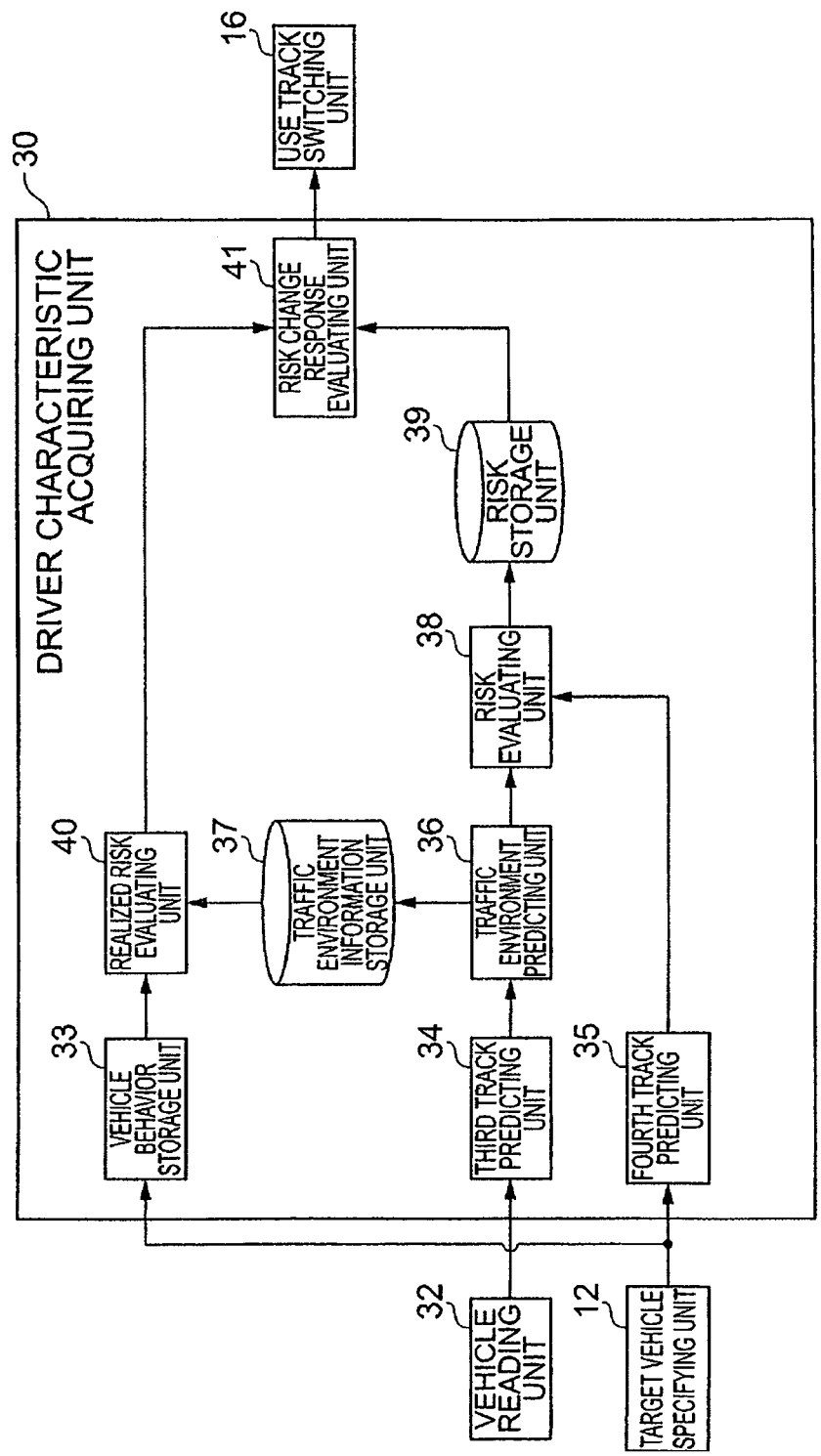
FIG. 9 is a block diagram illustrating the structure of a driver characteristic acquiring unit of the vehicle travel track estimator according to the third embodiment.

Next, a third embodiment of the invention will be described. This embodiment mainly differs from the first embodiment in the structure of the driver characteristic acquiring unit. FIG. 8 is a block diagram illustrating the structure of a vehicle travel track estimator according to this embodiment, and FIG. 9 is a block diagram illustrating the structure of the driver characteristic acquiring unit.

As shown in FIG. 8, a vehicle track estimating ECU 5 of the vehicle track estimator according to this embodiment includes a driver characteristic acquiring unit 30, a vehicle cutting unit 11, a target vehicle specifying unit 12, a map database 13, a first track predicting unit 14, a second track predicting unit 15, and a use track switching unit 16. In addition, the vehicle track estimating ECU 5 includes a cut vehicle storage unit 31 and a vehicle reading unit 32. The driver characteristic acquiring unit 30 includes a vehicle behavior storage unit 33, a third track predicting unit 34, a predicted result storage unit 35, a predicted change calculating unit 36, and a risk change response evaluating unit 37.

The cut vehicle storage unit 31 and the vehicle reading unit 32 have the same structure as the cut vehicle storage unit 21 and the vehicle reading unit 22 in the second embodiment. The vehicle behavior storage unit 33 of the driver characteristic acquiring unit 30 shown in FIG. 9 stores target vehicle storage information related to the speed of a target vehicle based on target vehicle information output from the target vehicle specifying unit 12 and the position of the target vehicle obtained with reference to map information read from the map database 13.

The third track predicting unit 34 stores the first prediction model read from the vehicle reading unit 32, and predicts the travel track of each of other vehicles as a third track on the basis of the speeds and positions of other vehicles based on other vehicle information read from the vehicle reading unit 22. The third track predicting unit 34 outputs the predicted travel tracks of other vehicles to the traffic predicting unit 36. The fourth track predicting unit 35 predicts a fourth track using the same process as that in the second embodiment, and outputs the predicted fourth track to the risk evaluating unit 38.

The traffic environment predicting unit 36 predicts a traffic environment using the same process as that in the second embodiment, and outputs traffic environment information to the traffic environment storage unit 37 and the risk evaluating unit 38. The traffic environment storage unit 37 stores the traffic environment information output from the traffic environment predicting unit 36, and outputs the traffic environment information stored in a realized risk evaluating unit 40 in response to requests from the realized risk evaluating unit 40.

The risk evaluating unit 38 evaluates the risk (the risk acquired by the target vehicle) of a target vehicle at the present time on the basis of the traffic environment information output from the traffic environment predicting unit 36 and the fourth track output from the fourth track predicting unit 35. The risk evaluating unit 38 outputs the evaluated risk and a risk signal based on the time when the risk is evaluated to the risk storage unit 39. The risk storage unit 39 stores the risk and the time based on the risk signal output from the risk evaluating unit 38. In this case, the lowest risk or a risk distribution may be stored as the risk signal. Next, the case in which the lowest risk is stored in the risk storage unit 39 will be described.

The realized risk evaluating unit 40 reads the realized track of the target vehicle of a predetermined elapsed period of time T (for example, one second ago) in vehicle behavior information which has been stored in the vehicle behavior storage unit 33 and reads the traffic environment of the elapsed time T in the traffic environment information stored in the traffic environment information storage unit 37. The realized risk when the realized track of the target vehicle is selected is calculated on the basis of the realized track of the target vehicle and the traffic environment information of the elapsed time T. The realized risk evaluating unit 40 outputs realized risk information based on the calculated realized risk to the risk change response evaluating unit 41.

The risk change response evaluating unit 41 reads the risk signal at the same time as that related to the realized risk based on the realized risk information output from the realized risk evaluating unit 40 (preferably, several seconds before the time T) from the risk storage unit 39. The risk change response evaluating unit 41 compares the realized risk signal output from the realized risk evaluating unit 40 with the risk signal read from the risk storage unit 39 to calculate a response speed. The read risk signal indicates the risk when a preferable response to a variation in traffic environment is made. The read realized risk signal reflects a response to the traffic environment of the target vehicle. Therefore, when the difference therebetween is increased over time, it is possible to determine that the response sensitivity is low and the target vehicle does not appropriately respond to a variation in traffic environment.

The simplest method of performing this determination is to determine whether the inclination when the difference between the risk and the realized risk is linearly approximated is more than a predetermined value. However, if the risk level is less than a predetermined threshold value, it may be determined that the response sensitivity is high and the target vehicle responds to a variation in traffic environment even when the difference between the risk and the realized risk is large. The essence of the determination is to determine whether the driver appropriately responds to a variation in traffic environment. A determining method is not limited to the above-mentioned method. For example, when the output of the risk evaluating unit 39 is a risk distribution, the average and variance of the distribution may be used to perform the determination by the deviation of the realized risk or the increase rate of the deviation. In addition, both the deviation and the increase rate of the deviation are used to perform bivariate determination.

When the driver of the target vehicle has high response sensitivity and the driver drives the vehicle with a uniform driving performance, the speed and position of the target vehicle varies similarly to the predicted change amounts of other vehicles. For example, when the speed of the target vehicle is increased or when the direction in which other vehicles approach the target vehicle varies, the speed of the vehicle is reduced or the vehicle is away from other vehicles.

However, for example, when the driver dozes off while driving the vehicle, that is, when the response sensitivity and the degree of alertness of the driver are low, the degree of correspondence of the target vehicle to the predicted change amounts of other vehicles is lowered. For example, when the speed of the target vehicle is high or when other vehicles are displaced so as to approach the target vehicle, the speed of the target vehicle is increased, or the target vehicle is positioned close to other vehicles. Therefore, risk change response evaluation can be performed on the basis of the speed and position of the target vehicle and the predicted change amounts of other vehicles to calculate the degree of alertness of the driver of the target vehicle.

If the calculated risk change response sensitivity is more than a risk change response sensitivity threshold value, the risk change response evaluating unit 37 outputs a second prediction switching signal for switching to the first target vehicle travel track to the use track switching unit 16. On the other hand, if the risk change response sensitivity is equal to or less than the risk change response sensitivity threshold value, the switching signal is not output.

Figure 10:
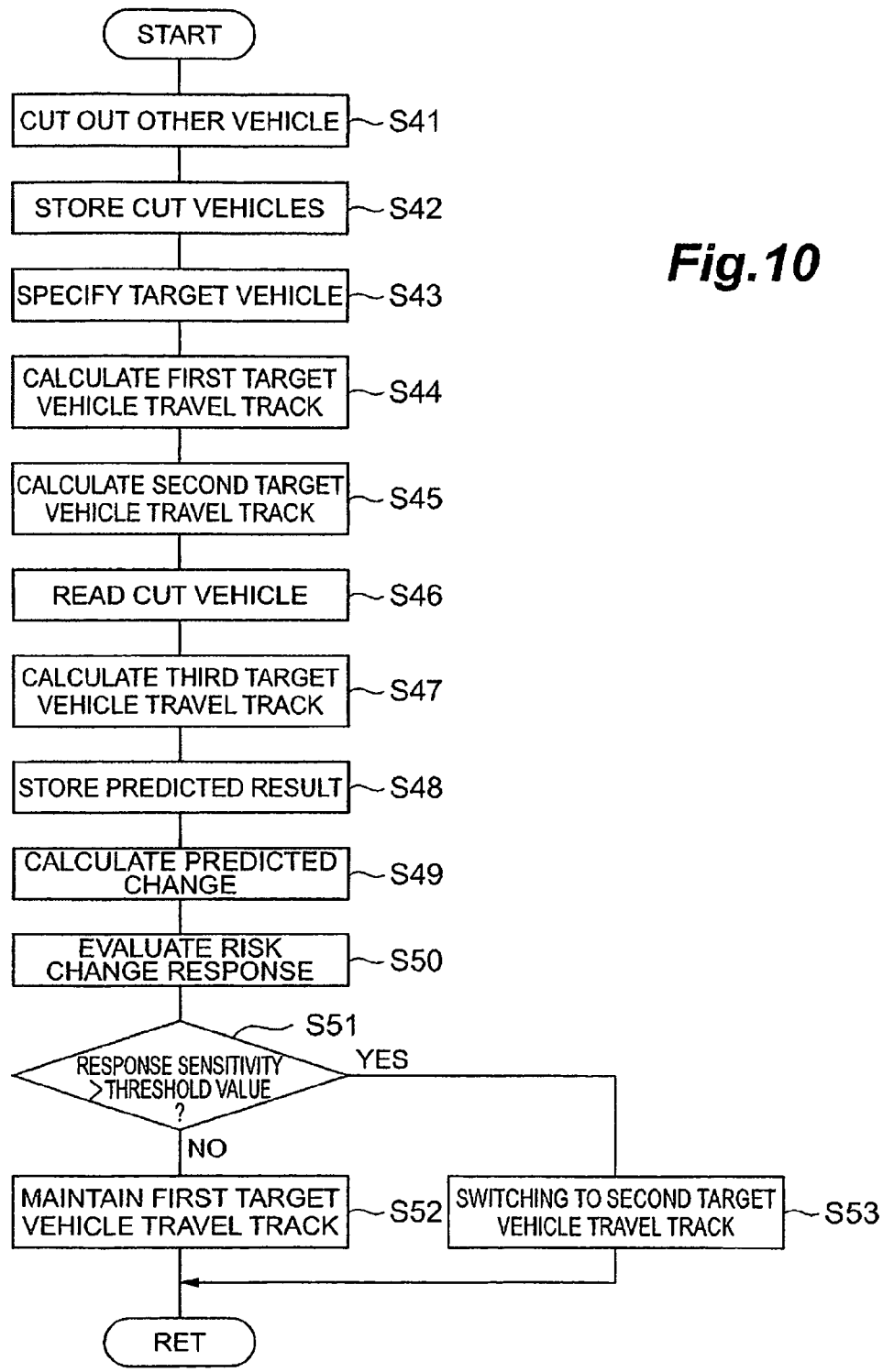
FIG. 10 is a flowchart illustrating a process of a vehicle track estimating ECU according to the third embodiment.

Next, a process of the vehicle track estimating ECU according to this embodiment will be described. FIG. 10 is a flowchart illustrating the process of the vehicle track estimating ECU according to this embodiment.

As shown in FIG. 10, in the vehicle track estimating ECU 5 according to this embodiment, first, the vehicle cutting unit 11 cuts out other vehicles from the surrounding information transmitted from the outside sensor 2 (S41), and stores other vehicle information related to the speeds and positions of the cut vehicles in the cut vehicle storage unit 31 (S42). Then, the target vehicle specifying unit 12 specifies a target vehicle which is a movement prediction target and is likely to collide with the driver's own vehicle among other vehicles (S43). Then, the first track predicting unit 14 calculates the first target vehicle travel track (S44), and the second track predicting unit 15 calculates the second target vehicle travel track (S45). Then, the vehicle reading unit 32 reads the cut vehicle stored in the cut vehicle storage unit 31 (S46). Then, the third track predicting unit 34 calculates the travel tracks of other vehicles as the third track and predicts the travel tracks (S47). These steps are the same as Steps S11 to S16 in the second embodiment.

Then, the third track predicting unit 34 stores the predicted travel tracks of other vehicles in the predicted result storage unit 35 (S48). The predicted result storage unit 35 stores a plurality of tracks of the same vehicle predicted by the third track predicting unit 34. Then, the predicted change calculating unit 36 calculates the predicted change amounts of other vehicles on the basis of the travel tracks of other vehicles output from the third track predicting unit 34 and the travel tracks of other vehicles stored in the predicted result storage unit 35 (S49).

Then, the risk change response evaluating unit 37 compares the speed and position of the target vehicle based on target vehicle storage information read from the vehicle behavior storage unit 33 with the predicted change amounts of other vehicles based on the predicted change amount information output from the predicted change calculating unit 36 to perform a risk change response evaluation (S50), thereby calculating a risk change response sensitivity. Then, the risk change response evaluating unit 37 determines whether the calculated risk change response sensitivity is more than the stored risk change response sensitivity threshold value (S51). As a result, when it is determined that the risk change response sensitivity is equal to or less than the risk change response sensitivity threshold value, no switching signal is output to the use track switching unit 16. Therefore, the use track switching unit 16 maintains the first target vehicle travel track as an estimated target vehicle travel track (S52). On the other hand, when it is determined that the risk change response sensitivity is more than the risk change response sensitivity threshold value, a switching signal is output to the use track switching unit 16. Therefore, the use track switching unit 16 switches the estimated target vehicle travel track to the second target vehicle travel track (S53). In this way, the travel track of the target vehicle is predicted.

As such, the vehicle travel track estimator according to this embodiment performs switching between the first target vehicle travel track and the second target vehicle travel track on the basis of the risk change response sensitivity, which is a reaction parameter of the target vehicle to other vehicles. Therefore, it is possible to reflect the degree of alertness of the driver of the target vehicle to the estimation of the travel track of the target vehicle. As a result, it is possible to accurately estimate the travel track of the target vehicle that is likely to collide with the driver's own vehicle.

Figure 11:
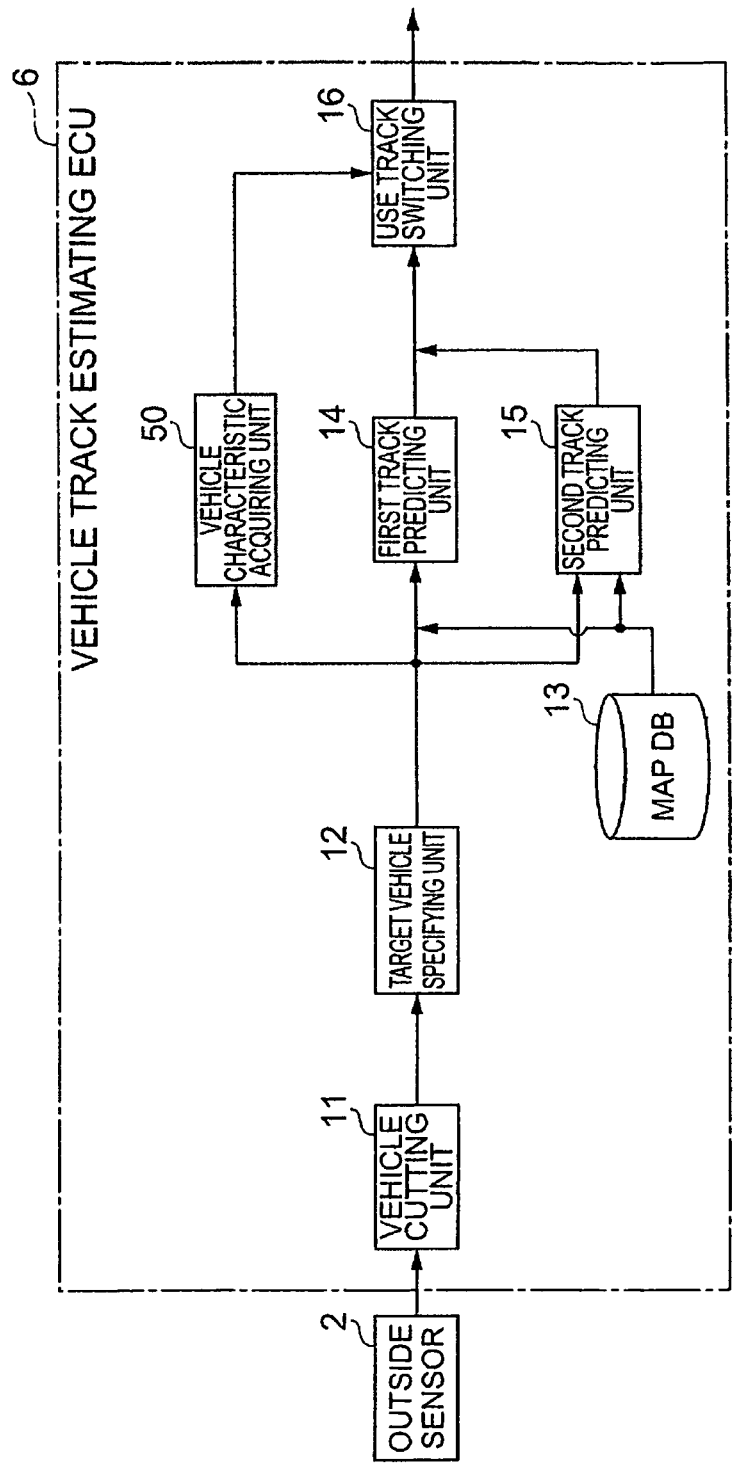
FIG. 11 is a block diagram illustrating the structure of a vehicle travel track estimator according to a fourth embodiment.

Next, a fourth embodiment of the invention will be described. FIG. 11 is a block diagram illustrating the structure of a vehicle track estimator according to the fourth embodiment of the invention.

As shown in FIG. 11, a vehicle track estimating ECU 6 of the vehicle track estimator according to this embodiment includes a vehicle cutting unit 11, a target vehicle specifying unit 12, a map database 13, a first track predicting unit 14, a second track predicting unit 15, a use track switching unit 16, and a vehicle characteristic acquiring unit 40. The vehicle cutting unit 11, the target vehicle specifying unit 12, the map database 13, the first track predicting unit 14, the second track predicting unit 15, and the use track switching unit 16 have the same structure as those in the first embodiment.

The target vehicle specifying unit 12 has a vehicle type identifying function of identifying the type of target vehicle as well as a function of specifying the target vehicle, which is the same as that in the first embodiment. When the target vehicle specifying unit 12 identifies the type of vehicles, for example, the outside sensor 2 is an image sensor and other vehicle information output from the vehicle cutting unit 11 is related to the images of other vehicles. In this case, the target vehicle specifying unit 12 stores a template for each type of vehicle and applies the image of the target vehicle to the template to identify the type of target vehicle. The target vehicle specifying unit 12 outputs vehicle type information related to the identified type of target vehicle to the vehicle characteristic acquiring unit 40.

The vehicle characteristic acquiring unit 40 stores various databases for vehicles to be the target vehicle. For example, the vehicle characteristic acquiring unit stores the type of vehicles to be the target vehicle, specifications (for example, an outer size and a minimum turning radius) corresponding to the type of vehicles, and a driving performance (for example, the maximum speed, the maximum acceleration, the maximum deceleration, and a steering following performance) as parameters. The vehicle characteristic acquiring unit 40 acquires specifications or a driving performance corresponding to the type of target vehicle on the basis of the vehicle type information output from the target vehicle specifying unit 12. In addition, the vehicle characteristic acquiring unit 40 stores a specification threshold value and a driving performance threshold value as the threshold values of the specifications and the driving performance of the target vehicle. The vehicle characteristic acquiring unit 40 determines whether the acquired specifications and driving performance of the target vehicle are more than the stored specification threshold value and driving performance threshold value. As a result, if it is determined that either or both the specifications and the driving performance are more than the threshold values, the vehicle characteristic acquiring unit outputs a switching signal to the use track switching unit 16. The other structures are the same as those in the first embodiment.

In the vehicle track estimator having the above-mentioned structure according to this embodiment, the target vehicle specifying unit 12 identifies the type of a specific vehicle specified on the basis of other vehicle information output from the vehicle cutting unit 11. The above-mentioned method using the template is used to identify the type of other vehicles. The target vehicle specifying unit 12 outputs vehicle type information related to the type of target vehicle identified to the vehicle characteristic acquiring unit 40. The vehicle characteristic acquiring unit 40 acquires specifications and a driving performance corresponding to the type of target vehicle on the basis of the vehicle type information output from the target vehicle specifying unit 12. In addition, the vehicle characteristic acquiring unit determines whether the acquired specifications and driving performance are more than the threshold values. If it is determined that at least one of the specifications and the driving performance is more than the threshold value, the vehicle characteristic acquiring unit outputs a switching signal to the use track switching unit 16.

As such, the vehicle track estimator according to this embodiment uses a performance (specifications or a driving performance) corresponding to the type of target vehicle as a parameter to estimate the track of the target vehicle. Therefore, it is possible to estimate the travel track of the target vehicle according to driver characteristics corresponding to the type of vehicle. As a result, it is possible to accurately estimate the travel track of the target vehicle that is likely to collide with the driver's own vehicle.

In this embodiment, the vehicle characteristic acquiring unit 40 sets a threshold value to specifications or a driving performance corresponding to the type of vehicle. However, simply, the vehicle characteristic acquiring unit may determine whether a switching signal corresponding to the type of vehicle is output. In this case, for example, when the type of vehicle output as the vehicle type information is a general type of model, the switching signal may not be output. When the type of vehicle is a specific type of model, the switching signal may be output. It is preferable that a vehicle having a relatively large size of specifications and a relatively high driving performance be set as the general type of model in terms of a fail-safe method.

Although the exemplary embodiments of the invention have been described above, the invention is not limited thereto. For example, in the first embodiment, the degree of axis deviation is used as the driver characteristics. However, the tendency of the operation amount of the driver of a specific vehicle may be used as the driver characteristics. The operation amount includes, for example, acceleration, deceleration, and a steering angular velocity. When the tendency of the operation amount is used, a predetermined threshold value may be set to the frequency of a specific operation amount of the target vehicle. If the frequency of the operation amount is more than the predetermined threshold value, a switching signal may be output. For example, when it is determined that the driver of a specific vehicle frequently rapidly accelerates the vehicle, that is, the driver has a 'tendency to rapidly accelerate the vehicle', the switching signal may be output. In addition, the other driver characteristics may include, for example, accelerator or brake operation characteristics including whether the driver easily passes another vehicle and whether the driver easily increases the speed of the vehicle.

In addition, current state tendency may be used as the driver characteristics. The current state may include, for example, an absolute position, a relative position with respect to the road, a speed, a direction, and a tire angle. When the current state tendency is used, a predetermined threshold value may be set to the frequency of a specific current state of the target vehicle. When the frequency of the current state is more than the predetermined threshold value, a switching signal may be output. In the fourth embodiment, the type of target vehicle is identified as the vehicle characteristics. However, for example, vehicles may be classified into 'large vehicles' and 'small vehicles' without identifying the type of vehicle.

In each of the above-described embodiments, the first track predicting unit 14 and the second track predicting unit 15 calculate two travel tracks, and perform switching between the two travel tracks. However, three or more travel tracks may be calculated, and the travel tracks may be switched on the basis of driver characteristics or vehicle characteristics. In each of the above-described embodiments, the first prediction model gives the conditions that the driver observes the traffic regulations, and the second prediction model gives the conditions that the driver does not observe the traffic regulations. However, the prediction model may be used on the basis of other conditions.

INDUSTRIAL APPLICABILITY

The invention can be applied to a vehicle travel track estimator that estimates the travel track of a target vehicle.

The invention claimed is:

1. A vehicle travel track estimator comprising:

a plurality of target vehicle travel track estimating units that each estimate, in different ways, a travel track of a single target vehicle which is likely to collide with a driver's own vehicle; and a characteristic detecting unit that detects characteristics of the target vehicle, wherein the plurality of target vehicle target track estimating units estimate a first target vehicle travel track under conditions that the target vehicle observes the traffic regulations and a second target vehicle travel track under conditions that the target vehicle does not observe the traffic regulations, as the travel path of the single target vehicle, wherein either the first target vehicle travel track or the second target vehicle travel track is selected as the travel path of the single target vehicle on the basis of the characteristics of the target vehicle, to estimate the travel track of the target vehicle.

2. The vehicle travel track estimator according to claim 1, wherein the characteristic detecting unit includes a vehicle characteristic acquiring unit that acquires vehicle characteristics of the target vehicle, and either the first target vehicle travel track or the second target vehicle travel track is selected as the travel path of the single target vehicle on the basis of the vehicle characteristics of the target vehicle to estimate the travel track of the target vehicle.

3. The vehicle travel track estimator according to claim 1, wherein the characteristic detecting unit includes a driver characteristic acquiring unit that acquires characteristics of a driver of the target vehicle, and either the first target vehicle travel track or the second target vehicle travel track is selected as the travel path of the single target vehicle on the basis of the characteristics of the driver to estimate the travel track of the target vehicle.

4. The vehicle travel track estimator according to claim 3, wherein the driver characteristic detecting unit includes:

a vehicle axis direction acquiring unit that acquires the axis direction of the target vehicle;

a lane direction acquiring unit that acquires the direction of a lane in which the target vehicle travels; and an axis deviation acquiring unit that acquires the degree of deviation between the axis direction of the target vehicle and the direction of the lane in which the target vehicle travels, and either the first target vehicle travel track or the second target vehicle travel track is selected as the travel path of the single target vehicle on the basis of the degree of deviation between the axis direction and the lane direction to estimate the travel track of the target vehicle.

5. The vehicle travel track estimator according to claim 4, wherein the second target vehicle travel track is selected as the travel path of the single target vehicle when the degree of deviation between the axis direction and the lane direction is more than a threshold value and the first vehicle travel track is selected as the travel path of the single target vehicle when the degree of deviation between the axis direction and the lane direction is equal to or less than the threshold value.

6. The vehicle travel track estimator according to claim 3, wherein the driver characteristic detecting unit includes a parameter acquiring unit that acquires a reaction parameter related to the reaction of the driver of the target vehicle to other vehicles, and either the first target vehicle travel track or the second target vehicle travel track is selected as the travel path of the single target vehicle on the basis of the reaction parameter related to the reaction of the target vehicle to other vehicles to estimate the travel track of the target vehicle.

7. The vehicle travel track estimator according to claim 6, wherein the reaction parameter indicates the tolerable risk level of the target vehicle for collision.

8. The vehicle travel track estimator according to claim 2, wherein the reaction parameter indicates the sensitivity of the target vehicle to a risk.

9. The vehicle travel track estimator according to claim 7, wherein the second target vehicle travel track is selected as the travel path of the single target vehicle when the reaction parameter is more than a threshold value and the first vehicle travel track is selected as the travel path of the single target vehicle when the reaction parameter is equal to or less than the threshold value.

10. The vehicle travel track estimator according to claim 8, wherein the parameter indicating the sensitivity of the target vehicle to the risk is the degree of alertness of the driver of the target vehicle.

11. The vehicle travel track estimator according to claim 6, wherein the reaction parameter indicates the sensitivity of the target vehicle to a risk.

12. The vehicle travel track estimator according to claim 11, wherein the parameter indicating the sensitivity of the target vehicle to the risk is the degree of alertness of the driver of the target vehicle.

* * * * *